May 1, 1945.    R. HARDY    2,374,817

PULSE GENERATOR PARTICULARLY FOR ELECTRIC PHASE METERING

Filed May 24, 1943

INVENTOR.
RENÉ HARDY

BY *Edward D. Phinney*

ATTORNEY

Patented May 1, 1945

2,374,817

UNITED STATES PATENT OFFICE 2,374,817

PULSE GENERATOR, PARTICULARLY FOR ELECTRIC PHASE METERING

René Hardy, Lyon, France, assignor to International Standard Electric Corporation, New York, N. Y.

Application May 24, 1943, Serial No. 488,292
In France December 31, 1940

8 Claims. (Cl. 172—245)

The present invention concerns pulse generator circuits especially applicable to phase measurement of a current or voltage.

In order to measure the relative phase difference of two currents or two voltages having a sinusoidal or analogous form, it is known to use a phase indicator such as a cathode ray oscillograph, and to produce on the screen of this oscillograph a circle formed in the following manner.

One of the electric waves is, for example, split into two waves of the same amplitude but in phase quadrature and these two waves in quadrature are then applied to the deflecting elements of the oscillograph so as to produce, when they are applied alone on the screen of the oscillograph, a complete regular circle which the cathodic spot describes under the control of these applied currents. A deformation of the circle image can then be produced to obtain the desired phase indication.

The present invention has especially, but not exclusively, for one of its objects, to provide pulse generator circuits for transforming a continuous sinusoidal electric variation into a series of pulses of determined position in a corresponding period, to obtain a radial modulation of the sweep circle produced from the first electric variation or reference wave, and consequently to furnish the phase difference measurement between the two variations.

In a general way the invention provides, according to certain of its embodiments, systems for the comparison of the phase of two electric waves, currents or voltages in which one of the waves is applied to a cathode ray oscillograph in such a way as to assure a continuous predetermined sweep on the screen of the oscillograph by the cathode beam, and the other wave is transformed into a series of pulses applied to the oscillograph to deform the image obtained by the sweep due to the first wave, this deformation of the image giving the measurement indication desired, the continuous sweep being preferably a circular sweep, and the deformation of the image being preferably a radial modulation, that is to say a return to the center of the screen of the cathodic spot.

According to one of the characteristics of the invention, a sinusoidal variation is rectified, then applied to the control grid of an electronic tube, so that only the points where the curve turns upwardly, or the minima of the rectified sinusoidal wave have an effect which causes in the anode circuit of this tube an output current formed by the pulses corresponding to these points, the anode current being substantially null the rest of the time.

In order to suppress one of the two points, so as not to have two pulses in each 360°, but only a single one indicating the exact phase, upon application to the cathode ray oscillograph or other indicator, there is superposed upon the rectified voltage, according to one form of the invention, an alternating voltage of weak value but, in phase with the rectified voltage, this voltage being, for example, tapped from the unrectified sinusoidal wave.

According to another embodiment of the invention, in order to obtain an indication only during a part of the interval between the pulses produced by a tube controlled, as above-mentioned, by a rectified sinusoidal voltage, there is superposed on this rectified voltage an alternating voltage of a multiple or sub-multiple frequency of the frequency of the rectified sinusoidal wave, which produces in the anode circuit of this tube a series of pulses, the individual pulses of which respectively correspond only to spaced pulses of the series which would have been obtained without the superposition of such alternating current of multiple frequency.

The invention will be shown in detail in the following description given with reference to the attached drawing, in which.

Figure 1:
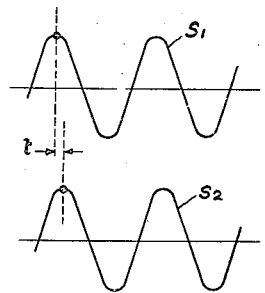
Fig. 1 is a diagrammatic representation of the two sinusoidal waves, the phase difference of which it is desired to measure.

The two sinusoidal waves, the phase difference of which it is desired to measure, for example in order to make a radiogoniometric determination, or any other indication, are shown in Fig. 1 by S1 and S2, the relative phase difference being defined by the difference in time, $t$, of the crests of the two sinusoidal waves.

Figure 2:
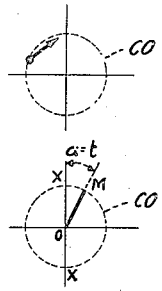
Fig. 2 is a diagrammatic representation of certain examples of indications which it is desired to obtain on the screen of a cathode ray oscillograph, for example, in order to measure this phase difference.

A simple way of obtaining a visual indication of this displacement $t$ is to provide a circuit giving upon an indicator such as a cathode ray oscillograph an image analogous to that shown, for example, in Fig. 2, that is to say a luminous indication comprised of a radially disposed line OM, the angle $\phi$ of which with reference to axis OX will measure the phase difference directly.

For this purpose, one system of phase measurement incorporating certain characteristics of this invention, has means for producing from one of the sinusoidal waves S1 and S2 of Fig. 1, a circular sweep of the spot over the screen of the cathode ray oscillograph, CO, the luminous track of this sweep over the screen being either illuminated so as to be visible or kept below visibility by any appropriate device, for example, by a device modulating the control grid of the oscillograph at the same time as the electrode to which the necessary radial modulation is applied.

This radial modulation may be obtained by producing, from the second sinusoidal wave, a series of control pulses which can be applied either on the deflecting elements of the oscillograph by superposition on the currents producing the circular sweep or on another appropriate electrode, for example, an anode of said oscillograph, or electrodes of special form, concentric, for example.

For the process considered by way of illustration in this description, it is necessary to provide a circular sweep of the indicating spot on the screen. For this purpose, there can be used the circuit given by way of example in Fig. 3, for producing the circular sweep from any suitable sinusoidal voltage, for example from S1.

Figure 3:
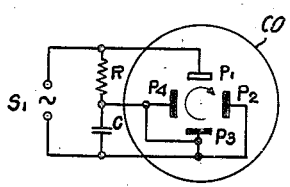
Fig. 3 is a diagram of a circuit producing the desired circular deviation, for example as a continuous sweep, from one of the sinusoidal waves of Fig. 1.

The circuit of Fig. 3 consists of a network arranged in quadrature comprising the resistance R and the capacity C connected as shown to the deflection plates P1, P2, P3, P4 or other like deflecting elements of the cathode ray oscillograph.

Figures 4, 5:
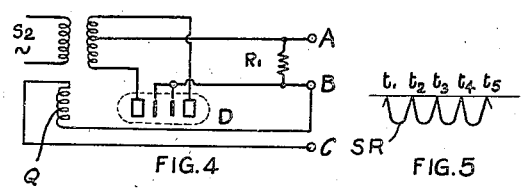
Fig. 4 is a diagram of a rectifier circuit for producing the second sinusoidal wave of Fig. 1.
Fig. 5 is a diagram of this rectified sinusoidal wave.

In order to produce a series of peaks of rapid current changes which produce the radial deflection of the spot at each rotation, toward the center, at the time $t$, corresponding to the phase shift, the second sinusoidal wave S2 is rectified, for example by means of a standard double diode D, as shown in the diagram of Fig. 4. At the ends AB of the resistance R1, there is obtained a rectified current SR, such as that shown in Fig. 5, having points $t1$, $t2$, etc. ... for its zero points.

Figure 6:
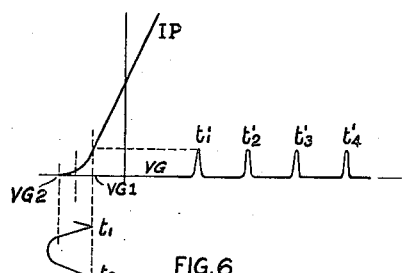
Fig. 6 is a diagram of the application of this rectified voltage to the control grid of a triode and the series of pulses produced in the anode circuit of this triode.
Figure 7:
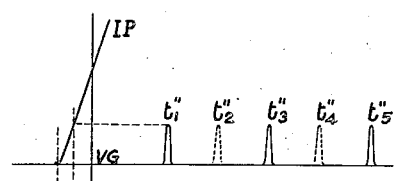
Figs. 7 and 8 are diagrams showing the application of the rectified voltage of Fig. 5 and of superposed sinusoidal voltages for obtaining a series of pulses permitting a realization of the phase measurement desired.
Figure 8:
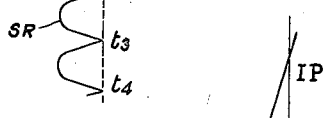

The current points thus produced are applied to the control grid of a tube, for example a triode, whose characteristic anode current-grid potential is for example that shown by IP—VG in Figs. 6 to 8. If the point of rest of the grid, i. e., the particular potential assumed by the grid with respect to the point of zero potential reference when no signal potentials are impressed upon the grid from an extraneous source, is at VG1, one applies the rectified voltage of Fig. 5 so that the current points $t1$, $t2$ ... coincide with this rest point VG1 as shown on Fig. 6. The resulting anode current will be of the form shown on the current-voltage curve, that is to say will consist of pointed pulses $t'1$, $t'2$ ... and the rest of the time there will be substantially no anode current.

This series of anode pulses may be used to radially modulate the cathodic spot, but there would then be obtained for a rotation of the spot, two radii at 180° separation, comprising a diameter of the circle of sweep. For, if the first continuous sweep is linear, and the series of pulses is superposed during the fraction of time necessary for the observation of the phenomena between two pulses, two indications will be given spaced apart a distance corresponding to 180°. It is, therefore, necessary for a direct measurement extending over 360°, to provide means for suppressing one pulse out of two or, to take only one pulse out of several, for yielding a single indication.

A first method provided according to one form of this invention in order to obtain phase indications over 360° consists in superposing, as shown in Fig. 7, a sinusoidal voltage of weak value S3 on the rectified voltage SR of Fig. 5, on the grid of the triode tube. This weak sinusoidal voltage may be obtained in any convenient manner from the unrectified sinusoidal voltage S2 from which SR has been produced, with any suitable diminution of amplitude. Winding Q of Fig. 4 will give between points A and C the desired type of current. The resulting curve is then of the form shown by the dotted line S'R and the plate current is then such as shown on Fig. 7, that is to say composed of points $t''1$, $t''3$, etc. ... points $t''2$, $t''4$, etc. ... being suppressed, by means of an additional discharge toward the left of the working point VG1 of the control grid. Only one point of each two, with respect to the system of Fig. 6, will appear in the feed and this point will give the actual value of the phase difference time, $t$, to be measured. The luminous indication will then be such as that shown in the lower portion of Fig. 2.

As above-mentioned, it is desirable to extinguish the spot when it describes the circumference and to illuminate it only when it describes the radius OM. This can be done, for example, by modulating the grid of the cathode oscillograph at the same time as the electrode, for example the anode, to which is applied the series of measuring pulses. In the event of a slight variation of the amplitude of the circle, or even of external disturbances, there will thus be no danger of unwanted images appearing on the screen.

Another means for obtaining useful indications only, on the screen of the oscillograph, from the series of pulses is shown, according to another embodiment of the invention, in the diagram of Fig. 8. In this figure the control grid of the tube creating the pulses simultaneously receives the rectified voltage in half-sinusoidal waves SR and an alternating voltage in convenient proportion which has a multiple or submultiple relation to the frequency of the rectified sinusoidal wave, a lower frequency, for example as shown by S4. This is readily obtained by coupling coil Q of Fig. 4 to a source of such multiple frequency. The complex current resulting on the grid is then such as indicated by the curve S''R, and produces in the anode circuit an output current consisting of the effective points T1, T2, etc. ... each spaced, for example by 7 pulses (shown by dots) in comparison with the output current of Fig. 6. It is then an easy matter to illuminate the indicating spot only during the moment when the first pulse occurs, for example, by means of a time constant circuit whose structure and functioning are well-known in the art.

Figure 9:
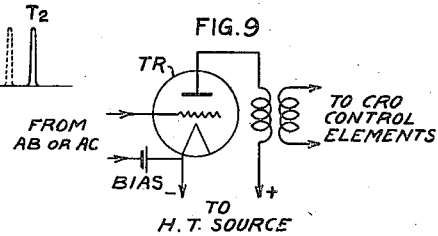
Fig. 9 shows schematically the connection of various elements of this invention.

Fig. 9 shows one method of connecting the circuits of Figs. 3 and 4, via a triode TR, to the cathode ray tube, to produce the various effects above-described.

It is clear that the invention is not limited only to the examples of embodiments shown and described as to the principal portions, the known arrangements themselves not being given in detail. The invention is applicable to numerous systems of phase measurement and not only to radiogoniometric systems; in fact it may find applications wherever there are two sinusoidal waves whose phase difference one wishes to measure, if it is variable.

Other modifications and applications of the invention, without departing from its spirit, will be apparent to those skilled in the art.

I claim:

1. Apparatus for determining the phase difference between two waves of the same frequency which comprises a cathode ray oscillograph, means actuated by one wave for producing a continuous circular trace on the oscillograph, means for producing synchronized impulses from the other wave, means for suppressing alternate impulses, and means actuated by unsuppressed impulses for deforming the trace as a single radial line at only a single point in the circuit of said continuous trace, arranged to indicate said phase difference by the position of said deformation.

2. Apparatus as set forth in claim 1, in which the means for suppressing alternate impulses comprises a synchronized sinusoidal wave superposed on said impulses.

3. Apparatus as set forth in claim 1, in which the means for producing synchronized impulses comprises a full wave rectifier and the means for suppressing alternate impulses comprises means for superposing a synchronized sinusoidal wave on the output of said rectifier.

4. Apparatus as set forth in claim 1, in which the means for suppressing alternate impulses comprises means for superposing on said impulses a sinusoidal wave whose frequency is a sub-multiple of the impulse frequency.

5. Apparatus as set forth in claim 1, in which the means for producing synchronized impulses comprises a full wave rectifier and a peak amplifier for the rectifier output.

6. A method for determining the phase difference between two waves of the same frequency by visual indication on a cathode ray oscillograph which comprises producing on the oscillograph a continuous circular trace synchronous with one wave, producing synchronous impulses from the other wave, suppressing alternate impulses and applying said unsuppressed impulses to the oscillograph to deform said trace as a single radial line at a single point in its circuit, the position of said deformation indicating said phase difference.

7. The method set forth in claim 6, in which the alternate impulses are suppressed by rectifying both limbs of the other wave to form a pulsating direct current wave and superposing on said direct current wave an alternating current wave having peaks synchronized with the peaks of the direct current wave.

8. The method set forth in claim 6, in which the alternate impulses are suppressed by rectifying both limbs of the other wave to form a pulsating direct current wave and passing the resultant wave through a peak amplifier.

RENÉ HARDY.